United States Patent [19]

Steinkuhl et al.

[11] Patent Number: 5,156,258
[45] Date of Patent: Oct. 20, 1992

[54] SCRAPER-CHAIN CONVEYORS FOR USE IN MINERAL MINING

[75] Inventors: Bernd Steinkuhl; Detlef Hahn, both of Lunen, Fed. Rep. of Germany

[73] Assignee: Westfalia Becorit Industrietechnik GmbH, Fed. Rep. of Germany

[21] Appl. No.: 797,703

[22] Filed: Nov. 25, 1991

[30] Foreign Application Priority Data

Nov. 27, 1990 [DE] Fed. Rep. of Germany ....... 4037659

[51] Int. Cl.$^5$ .............................................. B65G 19/18
[52] U.S. Cl. ................................ 198/735.6; 198/861.2
[58] Field of Search ................. 198/735.6, 735.2, 861.2

[56] References Cited

FOREIGN PATENT DOCUMENTS

| | | | |
|---|---|---|---|
| 3150459 | 11/1981 | Fed. Rep. of Germany ... | 198/735.6 |
| 3903347 | 8/1990 | Fed. Rep. of Germany ... | 198/735.2 |
| 2106066 | 4/1983 | United Kingdom ............. | 198/735.2 |
| 2065056 | 6/1991 | United Kingdom ............. | 198/735.6 |
| 2241482 | 9/1991 | United Kingdom . | |

Primary Examiner—Robert P. Olszewski
Assistant Examiner—Cheryl L. Gastineau
Attorney, Agent, or Firm—Samuels, Gauthier & Stevens

[57] ABSTRACT

A channel section or pan for a scraper-chain conveyor has a floor plate welded between side walls. The floor plate has reduced thickness end regions which provide upper and lower tongues which establish joints with corresponding complementary tongues of the floor plates of adjacent pans. Each tongue has a prominent curvilinear profile in plan view with several smooth curved projections and depressions transverse of the floor plate.

20 Claims, 2 Drawing Sheets

SCRAPER-CHAIN CONVEYORS FOR USE IN MINERAL MINING

FIELD OF THE INVENTION

The present invention relates in general to scraper-chain conveyors and, more particularly, to the channel sections or pans of such conveyors.

BACKGROUND OF THE INVENTION

The troughs or pans of conventional scraper-chain conveyors, as used in mineral mining operations, are usually composed of a stout floor plate or tray connected between a pair of side walls each with a general sigma-shaped profile. The side walls and the floor plate define upper and lower guide channels in which scrapers of a scraper-chain assembly are guided in a conveying upper run and in a return lower run.

It is known to connect the individual pans together in end-to-end relationship so that the pans can perform certain angular movements in horizontal and vertical planes relative to one another. To achieve this, the pans are connected together at their adjacent ends with connectors such as toggles, threaded bolts or coupling eyes. During operation, gaps can open up at the joints between the floor plates of adjacent pans and fine material can fall though these gaps to build up in the lower run. To avoid this, it is known to provide the floor plates with reduced or stepped end regions which provide mutually overlapping tongues. The floor plate joints can also be formed by providing welded-on strips at the ends of the floor plates. The overlapping tongues at the ends of the floor plates extend perpendicular to the longitudinal axis of the pans over their entire length. It is also known to provide axially extending projections which engage in recesses at the mutually facing ends of the floor plates of the joints to align and centre the pans in vertical and lateral directions (See DE-OS-3903347 and DE-PS-3150459). In these cases the overlapping tongues of the floor plates are provided with rectangular recesses and projections.

During operation, when the scraper-chain assembly is circulated along the pans to transport material loud noises frequently occur when the scrapers impact on the joints between the floor plates or drop into depressions at these joints. This noise is especially prominent when the pans are inclined relative to one another and this is often the case when the pans are laid on anticlines and synclines at the floor of the mine working. When resting on an anticline the upper overlapping tongues of the floor plates which project over the lower overlapping tongues can incline to protrude over the general level of the floor plates to form an impediment to the passage of the scrapers. To counteract this problem it is known to chamfer the overlapping upper tongue-see DE-OS-3903347. This measure does reduce the noise and wear but does not eliminate these undesirable aspects.

An object of the present invention is to provide channel sections or pans for a scraper-chain conveyor, particularly for in-board conveyors with a scraper-chain assembly with one or more chains running along the central region of the conveyor pans, in which the joints of the floor plates of adjacent pans are improved.

Another object is to so construct the joints between floor plates of adjacent pans that there is adequate sealing at all times with the gentlest possible passage by the scrapers without excessive noise even if the pans become inclined relative to one another.

SUMMARY OF THE INVENTION

In accordance with the invention, the joints between the floor plates of an adjacent pair of pans of a scraper-chain conveyor are established by mutually overlapping tongues defined by edges or boundaries transverse of the floor plates which are curved or more preferably undulating. Thus the floor plate of each pan would have end regions which are reduced in thickness and have outer edges defining complimentary convex and concave shapes.

The uppermost tongue may have a main convex shape with a crest or apex which extends from a joint line perpendicular to a longitudinal axis of the floor plate and extending between adjacent ends of the side walls by a distance approximately equal to the distance between the inner and outer edges or boundaries of the upper tongue and projects with this distance on the longitudinal axis of the floor plate. Preferably the convex shape of the uppermost tongue is combined with concave end regions to provide a flat undulating shape. The lowermost tongue of the floor plate at the opposite end to the uppermost tongue would then have a main concave shape with a maximum depth again approximately equal to the distance between the inner and outer edges or boundaries of the lower tongue and is offset with this distance inwardly along the axis of the floor plate from the joint line at this end. Preferably the concave shape of the lowermost tongue is combined with convex or otherwise projecting end regions to provide a flat undulating shape complementary to the shape of the uppermost tongue. Thus when the upper and lower tongues of curved or undulating profile at the ends of a pair of pans are united to provide a curvilinear joint between the floor plates the scrapers cannot contact any projection or depression of the joint over the full width of the floor plates. Instead the lower surfaces of the scrapers always transfer over the joint at an angle and progressively and smoothly largely without impact. Noise is considerably reduced. Even if the pans should cant relative to one another the joints are able to adapt without creating projections or depressions which interfere with the passage of the scrapers.

Preferably the concave and convex main central regions of the tongues are aligned on the longitudinal central axis of the floor plate and have a radius of curvature at least approximately equal to one-half of the length of the pan.

It is feasible to provide similar curved ends to a base plate fitted to the bottom of the side walls to close off the lower run of the pan. In this case the ends need not overlap but can simply form a butt joint with the similarly shaped ends of the base plates of adjacent pans. It is preferred to have the shape of the ends of the base plate opposite in sense to the corresponding ends of the floor plate. Thus a convex main region of a floor plate end region tongue would overlie a concave main region of a base plate end region and vice versa.

A channel section or pan constructed in accordance with the invention may comprise a pair of side walls, a floor plate extending between the side walls and end regions of the floor plate which are reduced in thickness to provide upper and lower tongues adapted to overlap with complementary tongues of the floor plates of adjacent pans with which the pan is to be connected;

wherein the tongues are curvilinear in plan view across the floor plate.

The tongues may be defined by inner and outer parallel boundaries extending transversally of a longitudinal centre axis of the floor plate and the boundaries then follow undulating profiles of complementary form.

The invention may be understood more readily and various other aspects and features of the invention may become apparent from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
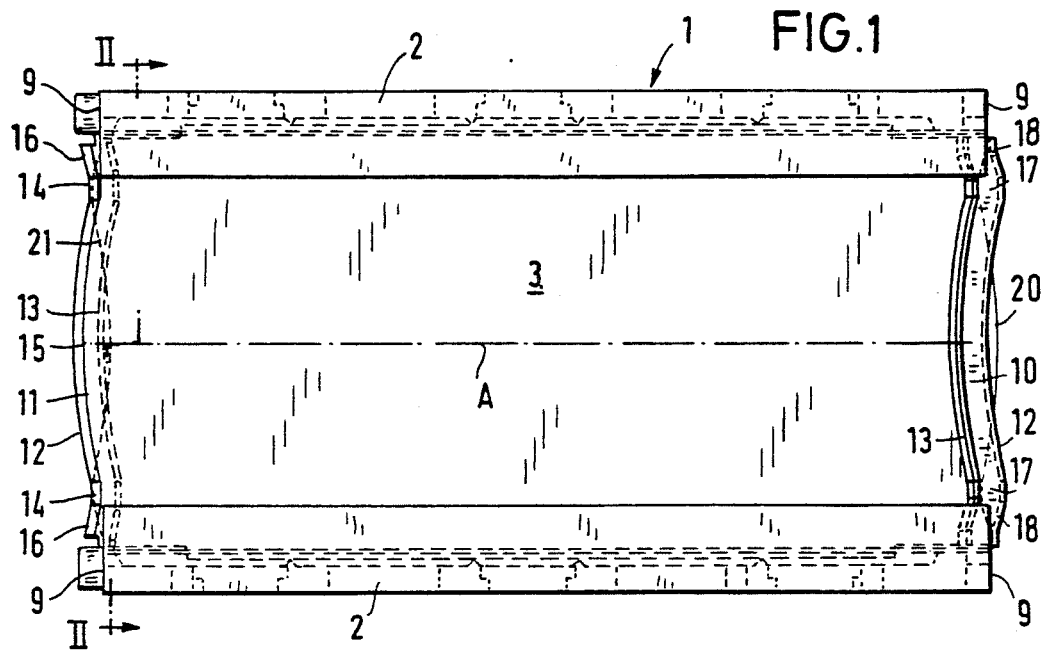
FIG. 1 is a plan view of a channel section or pan of a scraper-chain conveyor constructed in accordance with the invention.

The channel sections or pans 1 shown in the drawings are intended for use with a scraper-chain conveyor in which a scraper-chain assembly (not shown) of the inboard type, i.e. with the chain or chains passes along longitudinal central regions of the pans 1 arranged end-to-end. As is known, the scrapers of the assembly are guided at their ends by guides defined by the side walls and the floor plates of the pans 1. Each pan 1 is composed of two symmetrical side walls 2 with a floor plate 3 welded therebetween. The floor plate 3 separates the upper run 4 and the lower run 5 of the pan and hence of the conveyor along which the scraper-chain assembly is circulated. The side walls 2 are each sub-divided into two profiled strip pieces 6 one above another. The profiled piece 6 making up each side wall 2 have wall portions 7 welded to the floor plate 3 which then extends between the wall portions 7. The profiled pieces 6 are identical and define with the floor plate the aforementioned guides for the scrapers (not shown). Fittings of various kinds can be mounted on the side walls 2 in known manner.

Figure 3:
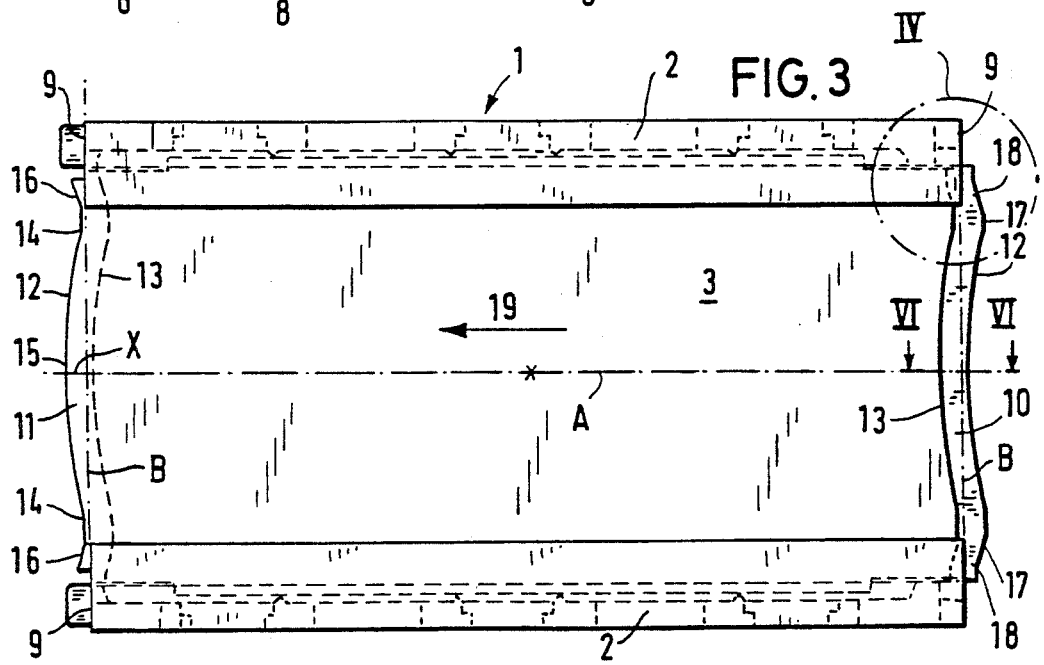
FIG. 3 is another plan view of a channel section or pan of a scraper-chain conveyor constructed in accordance with the invention.
Figure 5:
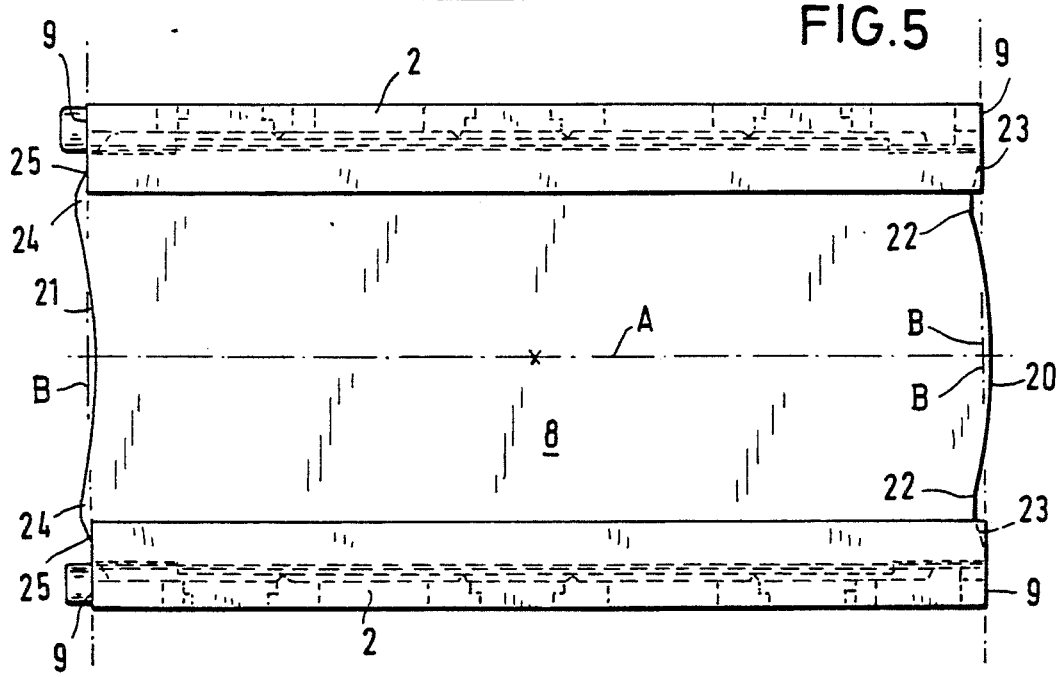
FIG. 5 is a further pan view of a channel section or pan of a scraper-chain conveyor constructed in accordance with the invention but with the floor plate removed.
Figure 6:
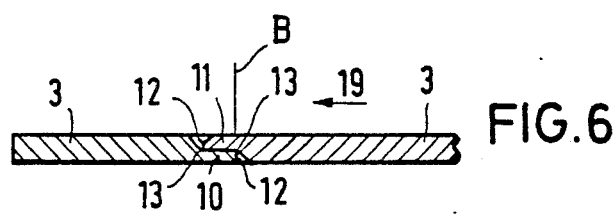
FIG. 6 is a sectional side view of a joint between the floor plates of two adjacent pans as shown in FIG. 3, the view being taken along the line VI—VI of FIG. 3.

A base plate 8 extends over the lower run 5 and is fixed to the lowermost profiled pieces 6 for example by welding. As is normal with scraper-chain conveyors, the pans 1 are joined together to permit a certain amount of angular mobility between the pans 1. The ends 9 of the side walls 2 of each pan are provided with projections and recesses for interconnecting the walls 2 of adjacent pans 1 together. In FIGS. 3 and 5, the joints between the floor plates of adjacent pans 1 are represented by chain dotted lines marked 'B' and these joint lines extend perpendicularly to the longitudinal central axis A of the pans and between the ends of the side walls 2. The pans 1 can move angularly relative to one above about the joint lines B to a limited extent say 4° to 7°. At the joints between the pans 1, the floor plates 3 of the pans 1 have a stepped profile with overlapping tongues 10, 11 (FIG. 6). Each pan 1 has one tongue 11 at one end of its floor plate 3 which is located adjacent to the top surface of the plate 3 and one tongue 10 at the other end of the floor plate 3 which is located adjacent the bottom surface of plate 3. Thus, when the adjacent pans 1 are brought together the upper tongue 11 of one pan 1 engages over the lower tongue 10 of the other pan 1. The tongues 10, 11 have characteristically curved outer edges as shown in FIG. 3 such that the upper tongue 11 extends for the greater part of its length forwardly of the joint line B while the lower tongue 10 extends for the greater part of its length inwardly of the joint line B.

The tongues 10, 11 can be formed integrally with the floor plate 3 of each pan 1 by machining although it is possible to fabricate the tongues 10, 11 as separate strips which are welded to the floor plate 3. The parallel boundary lines or edges of the tongues 10, 11 are indicated by reference numerals 12, 13 where the reference 12 is the free front edge of each tongue 10, 11 and the reference 13 is the rear edge.

Figure 4:
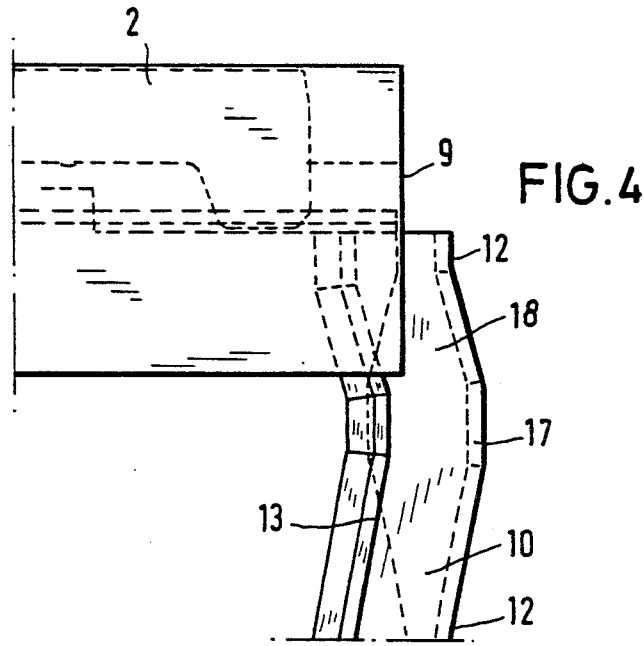
FIG. 4 is an enlarged plan view of a part of the pan shown in FIG. 3 and indicated by reference IV.

FIGS. 1, 3 and 4 show the smoothly curved edges 12, 13 of the tongues 10, 11 which are complementary to one another i.e. one convex and one concave at matching locations. The main convex edge 12 of the upper tongue 11, extends over on outer region 15 between positions 14 on or near the joint line B and the radius of curvature is at least approximately equal to one-half of the length of the pan 1 with its centre on the axis A. The position 14 are spaced from the side walls 2 and the welded joints between the wall portions 7 and the floor plate 3. The edges 12, 13 of the tongue 11 extend outwardly over regions 16 between the positions 14 and the welded joints and the regions 16 are curved in an opposite concave sense. This provides the outer edge 12 with a slightly undulating profile with a maximum projecting distance X from the joint line B at the axis A and curving from here back to the positions 14 on or near the joint line B and then outwardly again towards the side walls 2. The inner edge 13 extends parallel to the outer edge 12. The positions 14 at which the main curvilinear region 15 of the edge 12 terminate can be set back relative to the joint line B so that the curved regions 16 can terminate more or less on the joint line B at the side walls 2.

The tongue 10 at the opposite end of the floor plate 3 has its edges 12, 13 shaped in a mirror image to the tongue 11. Accordingly the rear edge 13 of concave form over the central part intersects the joint line B at positions corresponding to 14 while the front edge 12 at these locations provide distinct projections 17. From those projections 17 the edges 12, 13 curve in the opposite sense over regions 18 terminating at the side walls 2.

FIGS. 3 and 4 show that the edge 12 of the tongue 10 projects slightly beyond the joint line B on the axis A and then progressively projects further beyond the line B to the projections 17 from whence it returns back towards the joint line B. At the transitions from the edge 12 of the tongue 10 to the side walls 2 the regions 18 of the edge 12 preferably still has a small projection beyond the line B at the joints 9 of the side walls 2 as shown in FIG. 4.

It can be seen also that the undulating contour of the tongues 10, 11 at the central longitudinal axis A has an apex or depth which is at the most approximately equal to the distance between the edges 12, 13 of each tongue 10, 11 and is preferably less than this. This is also the case for the offsets of the regions 16, 18.

When the pans 1 are connected together the forwardly projecting upper tongue 11 on the floor plate 3 of one pan 1 fits over the rearwardly projecting lower tongue 10 on the floor plate 3 of another pan 1. The complementary undulating contour of the tongues 10, 11 ensure a positive fit between the pans 1. The shape of the tongues 10, 11 however permit vertical angular movements between the pans 1 without the edge 12 of the upper tongue 11 protruding significantly over the upper surface of the floor plates 3 of the pans 1 to interfere with scrapers of the scraper-chain assembly or the conveyed material. Moreover, since the tongues 10, 11 have an undulating curved shaped the resultant connections between the floor plates 3 are such that the scraper-chain assembly running in the conveying direction (19 FIG. 3) can run smoothly over the adjacent floor plates 3 without impacts and kinking movements since there is never parallel contact between the scrapers and the joints. As a result the noise of the scrapers of the scraper-chain assembly striking the joints is greatly reduced.

Figure 2:
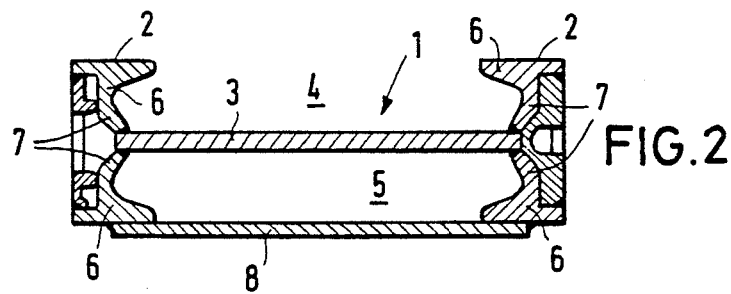
FIG. 2 is a sectional end view of the pan the view being taken along the line II—II of FIG. 1.
Figure 7:
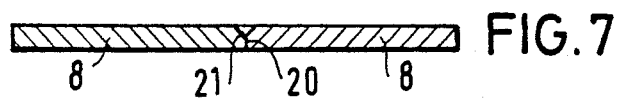
FIG. 7 is a sectional side view of a joint between the base plates of two adjacent pans as shown in FIG. 3.

In the case where the pans 1 are provided with base plates 8, as in FIG. 2, these plates 8 need not overlap as the floor plates 3. However, the edges of the joints 20, 21 between the base plates 8 of adjacent pans 1 can also have an undulating profile but opposite to those of the tongues 10, 11 of the floor plates 3 as depicted in FIG. 5. The joint edge 20 of the base plate 8 which lies underneath the rearwardly projecting tongue 10, thus has a central convex curved profile between depressions at positions 22 approximately corresponding to the edge 12 over the region 15 of the tongue 11. The joint edge 20 projects slightly beyond the relevant joint line B at the axis A and from here the convex profile runs to the positions 22 offset inwardly from the joint line B. The edge 20 then has end regions 23 curving in an opposite sense back to the joint line B. The joint edge 21 at the opposite end of the plate 8 is a minor image of the edge 20. Thus the edge 21 has a concave main central region running to forward projections 24 protruding outwardly from the joint line B. From the projections 24 the edge 21 curves back over regions 25 towards the joint line B at the side wall 2 to terminate inwardly of the joint line B. FIG. 7 shows the butt joints between the edges 20, 21 of adjacent base plates 8.

When the pans 1 are connected together the base or cover plates 8 thus make a close fit with their curved edges 20, 21 with the rounded forward projections 24 seating into the edge 20 at the depression 22. A substantially gap-free connection is thus ensured between the mating base plates 8. The scraper-chain assembly which return along the lower run 5 can thus also pass over the joints between the base plates 8 without impediment.

The joint line B between the joints 9 of the side walls 2 of adjacent pans 1 runs through the overlapping regions of the tongues 10, 11 and the edges 12, 13 of these are flat undulations with alternate concave and convex regions fitting one within another.

This is a preferred arrangement and it will be understood that the invention is not intended to be limited the above-described embodiment and other constructions can be adopted.

We claim:

1. A channel section or pan for a scraper-chain conveyor, the pan comprising a pair of side walls, a floor plate extending between the side walls and end regions of the floor plate which are reduced in thickness to provide upper and lower tongues adapted to overlap with complementary tongues of the floor plates of adjacent pans with which the pan is to be connected; wherein the tongues are curvilinear in plan view across the floor plate.

2. A channel section or pan for a scraper-chain conveyor, the pan comprising a pair of side walls, a floor plate extending between the side walls and end regions of the floor plate which are reduced in thickness to provide upper and lower tongues adapted to overlap with complementary tongues of the floor plates of adjacent pans with which the pan is to be connected; wherein the tongues are defined by inner and outer parallel boundaries extending transversally of a longitudinal central axis of the floor plate and the boundaries follow undulating profiles of complementary form.

3. A pan according to claim 2, wherein the undulating profile of each tongue has a maximum extent on the longitudinal axis of the floor plate.

4. A pan according to claim 3 wherein the maximum extent of the undulating profile of each tongue on the longitudinal axis of the floor plate and relative to a joint line perpendicular to the longitudinal axis and extending between adjacent ends of the side walls is approximately the same as the distance between the boundaries of the tongue.

5. A pan according to claim 2, wherein the upper tongue has a main convex central region on the longitudinal axis of the floor plate and the lower tongue has a main concave central region on the longitudinal axis of the floor plate.

6. A pan according to claim 2 wherein the tongue at one end of the floor plate has a main convex region centred on the longitudinal axis of the floor plate and end regions of concave form and the tongue at the other end of the floor plate has a main concave region centred on the longitudinal axis of the floor plate and end regions which project outwardly from the floor plate relative to the concave regions in the direction of the longitudinal axis.

7. A pan according to claim 6, wherein the concave end regions of the tongue at said one end are spaced from the side walls and the tongue has further end regions between the side walls and the first-mentioned concave end regions which project outwardly of the floor plate in the direction of the longitudinal axis relative to the first-mentioned concave end regions.

8. A pan according to claim 6 wherein the projecting end regions of the tongue at said other end of the floor plate are convex.

9. A pan according to claim 7, wherein the projecting end regions of the tongue at said other end of the floor plate are spaced from the side walls and the tongue has further end regions between the side walls and the projecting end regions which are disposed inwardly of the floor plate in the direction of the longitudinal axis relative to the projecting end regions.

10. A pan according to claim 2, wherein the boundaries of the tongues are in the form of inner and outer edges with the outer edge of one tongue extending predominantly outwardly from a joint line perpendicular to the longitudinal axis and extending between the adjacent ends of the adjacent side walls and the outer edge of the other tongue extending predominantly inwardly from a joint line perpendicular to the longitudinal axis and extending between the adjacent ends of the adjacent side walls.

11. A pan according to claim 9, wherein the main convex region of the tongue at said one end of the floor plate has an outer edge spaced outwardly in a direction along the longitudinal axis from a joint line perpendicular to the longitudinal axis and extending between the adjacent ends of the side walls, the first-mentioned end regions of the tongue at said one end of the floor plate have outer edges at or near the joint line, the main concave region of the tongue at said other end of the floor plate has an outer edge at or near a joint line perpendicular to the longitudinal axis and extending between adjacent ends of the side walls and the projecting end regions of the tongue at said other end of the floor plate have outer edges located outwardly from the joint line in a direction along the longitudinal axis.

12. A pan accordingly to claim 2, wherein the tongue at one end of the floor plate has an outer edge with a main central convex shape and the tongue at the other end of the floor plate had an outer edge with a main central concave shape and the radii of curvature of the convex and concave shapes are approximately equal to one-half the length of the pan.

13. A pan according to claim 2 and further comprising a base plate fixed between the side walls below the floor plate, the base plate having end regions of curved shape in plan view across the base plate complementing one another and adapted to form joints with end regions of base plates of adjacent pans.

14. A pan according to claim 13, wherein the end regions of the base plate have an undulating shape which has an opposite sense to the tongue of the floor plate thereabove.

15. A pan according to claim 5 and further comprising a base plate fixed between the side walls below the floor plate, the base plate having end regions of curved shape in plan view across the base plate complementing one another and adapted to form joints with end regions of base plates of the adjacent pans; wherein the end region of the base plate below the upper tongue of the floor plate has a main central concave edge region positioned on the longitudinal centre axis of the base plate.

16. A pan according to claim 15, wherein the main concave edge region of the base plate below the upper tongue of the floor plate is disposed inwardly of a joint line extending perpendicular to the longitudinal central axis of the base plate and between the adjacent ends of the side walls in the direction of said longitudinal axis.

17. A pan according to claim 16, wherein between the main central concave edge region of the end region of the base plate and the side walls the end region of the base plate has further edge regions adjacent the side walls and the further regions project outwardly from the joint line relative to the longitudinal central axis of the base plate.

18. A pan according to claim 16, wherein the end region of the base plate below the lower tongue of the floor plate has a main central convex edge region and the convex edge region is disposed outwardly of a joint line extending perpendicular to the longitudinal central axis of the base plate and between the adjacent ends of the side walls in the direction of said longitudinal axis.

19. A pan according to claim 18, wherein between the main central concave edge region of the end region of the base plate and the side walls the end region of the base plate has further edge regions adjacent the side walls and the further regions project outwardly from the joint line relative to the longitudinal central axis of the base plate and wherein between the main central convex edge region of the base plate and the side walls the end region of the base plate has further edge regions adjacent the side walls and the further regions are disposed inwardly from the joint line relative to the longitudinal central axis of the base plate.

20. A pan according to claim 1, wherein the tongues have curvilinear outer edges which extend progressively outwardly and inwardly across the floor plate relative to joint lines perpendicular to a longitudinal central axis of the floor plate and extending between the ends of the side walls.

* * * * *